US009129216B1

(12) United States Patent
Andras (10) Patent No.: US 9,129,216 B1
(45) Date of Patent: Sep. 8, 2015

(54) SYSTEM, METHOD AND APPARATUS FOR COMPUTER AIDED ASSOCIATION OF RELEVANT IMAGES WITH TEXT

(71) Applicant: Xdroid Kft., Szeged (HU)

(72) Inventor: Kocsor Andras, Szeged (HU)

( * ) Notice: Subject to any disclaimer, the term of this patent is extended or adjusted under 35 U.S.C. 154(b) by 233 days.

(21) Appl. No.: 13/941,634

(22) Filed: Jul. 15, 2013

(51) Int. Cl.
 *G06F 15/18* (2006.01)
 *G06N 5/02* (2006.01)
(52) U.S. Cl.
 CPC ....................................... *G06N 5/025* (2013.01)
(58) Field of Classification Search
 None
 See application file for complete search history.

(56) References Cited

U.S. PATENT DOCUMENTS

| | | | | |
|---|---|---|---|---|
| 8,023,155 | B2 * | 9/2011 | Jiang | 358/3.22 |
| 8,190,444 | B2 * | 5/2012 | Baudisch et al. | 705/1.1 |
| 8,380,728 | B2 * | 2/2013 | Manber et al. | 707/758 |
| 8,600,939 | B2 * | 12/2013 | Shoens | 707/639 |
| 8,631,012 | B2 * | 1/2014 | Leblang et al. | 707/741 |
| 8,666,833 | B2 * | 3/2014 | Spall et al. | 705/26.1 |
| 8,977,602 | B2 * | 3/2015 | Shoens | 707/698 |

OTHER PUBLICATIONS

Efficient Kernels for identifying unbounded-order spatial features Yimeng Zhang ; Tsuhan Chen Computer Vision and Pattern Recognition, 2009. CVPR 2009. IEEE Conference on DOI: 10.1109/CVPR.2009.5206791 Publication Year: 2009 , pp. 1762-1769.*

Real-Time Pose-Invariant Face Recognition by Triplet Pose Sparse Matrix from Only a Single Image Moeini, A. ; Moeini, H. ; Faez, K. Pattern Recognition (ICPR), 2014 22nd International Conference on DOI: 10.1109/ICPR.2014.89 Publication Year: 2014 , pp. 465-470.*
A Dynamic User Concept Pattern Learning Framework for Content-Based Image Retrieval Shu-Ching Chen ; Rubin, S.H. ; Mei-Ling Shyu ; Chengcui Zhang Systems, Man, and Cybernetics, Part C: Applications and Reviews, IEEE Transactions on vol. 36 , Issue: 6 DOI: 10.1109/TSMCC.2005.855507 Publication Year: 2006 , pp. 772-783.*
Enhanced Spoken Term Detection Using Support Vector Machines and Weighted Pseudo Examples Hung-Yi Lee ; Lin-shan Lee Audio, Speech, and Language Processing, IEEE Transactions on vol. 21 , Issue: 6 DOI: 10.1109/TASL.2013.2248721 Publication Year: 2013 , pp. 1272-1284.*

* cited by examiner

*Primary Examiner* — Michael B Holmes
(74) *Attorney, Agent, or Firm* — Shanti M. Hill; Beusse Wolter Sanks & Maire PLLC (57) ABSTRACT

Methods, systems, and apparatus, including computer program products are disclosed for the association of relevant images with text and presentation of image recommendations to users. In an aspect, text, image and user/usage information is processed in order to extract features therefrom and create three-component feature vectors called triplets. One or more reference databases store the triplets and a modeling component builds a model to learn and recommend images based on the triplets stored. A reference database may be initially populated with information from publically available image/text for use by the modeling component. Using the model, an Illustration Index is calculated for each image in a collection for a given text. Images are ranked by their Illustration Index and provided as recommendations for use with the text. User interactions with images provides the system with personalized feedback, adding new associations/triplets to the reference database to further refine the model.

20 Claims, 9 Drawing Sheets

SYSTEM, METHOD AND APPARATUS FOR COMPUTER AIDED ASSOCIATION OF RELEVANT IMAGES WITH TEXT

FIELD OF THE INVENTION

This invention relates to information technology and knowledge discovery.

COPYRIGHT

A portion of the disclosure of this document contains material that is subject to copyright protection. The copyright owner has no objection to the facsimile reproduction by anyone of the patent document or the patent disclosure, as it appears in publically available Patent and Trademark Office patent files or records, but otherwise reserves all copyright rights whatsoever. The following notice applies to the software, data, and/or screenshots which may be described below and in the drawings that form a part of this document: Copyright Xdroid Kft. All Rights Reserved.

BACKGROUND

In the internet age, large amount of textual content is created every minute—by writers, journalists, bloggers, tweeters, social network posters, content makers, or even automatized robots. However, readers prefer to bury themselves in content that is illustrated by an image rather than content comprising merely text.

Users who draft text for various purposes are aware of this psychological effect, so most try to find an appropriate image which fits the content by doing image search using search engines. Many search engines give good, relevant results when the users use appropriate keywords. These engines have built large databases with tagged to describe the content of images in digital archives. Tagging the images, is performed either automatically, or by using advanced image analysis and/or large amount of manual work. Technologies are also available to extract important keywords from text, however, simply combining keyword extraction and image searching does not solve a greater problem. Although this method may render a result for an image for a user to use to illustrate a given text, many issues still need to be solved.

First, a given text may bear more meaning than merely its words. So when it comes to an abstract, multi-layered meaning, keywords may be misleading. Second, the process of choosing an image to illustrate content is more than a simple mechanical process based on keywords. It is a complex process which involves personality, feelings, emotions, and mood. In addition, the same text may convey a multitude of emotional states. For example, the text may contain both sad and happy parts. Some people emphasize sad parts, others prefer to highlight happy parts, others visualize a hybrid mixture of the two emotional states. Because of this, different people oftentimes choose different images for illustrating the very same text.

There is a need for a solution which can learn and model human decision making with respect to the association of images to text and provide human-like, personalized image recommendations to correspond with a given text.

SUMMARY

The systems, methods, and apparatus disclosed herein (referred to individually or collectively for convenience as the "system") learn and model human decision making in order to recommend one or more appropriate images to correspond with a given text. Another aspect is to provide personalized recommendations by taking into account the user's image selections and user/usage information. The system may be used by any user wishing to illustrate text with personalized, relevant images, or the system may be used to automatically provide an image to illustrate a given text.

An object of this invention to provide a significant contribution to the advancement of the art of artificial intelligence and knowledge discovery.

In one aspect of the preferred embodiment, the system extracts features from text, images, and user/usage information and stores the extracted features as a three component triplet. The image may be a still image, a picture, a moving, animated image, a video, or similar pictorial rendering.

A further object of the system includes building an associative model based on sets of triplets. These triplets may be initially comprised of features extracted from privately or publically available image/text sources stored in one or more reference database(s) and used for machine learning an association function. The reference database may be expanded by adding triplets comprising features extracted for text/image associations made by users via the user's selection or skipping of a recommended image, or the user's uploading of an alternative image for use with the text (also referred to as user input). In this case, a third feature vector comprising features taken from the user/usage information (user behavior) form a third vector in the triplet.

A further object includes building an associative model to calculate an Illustration Index in order to output and rank relevant, personalized images to correspond with a given text.

A further object is to provide a mechanism for user interaction/behavior to provide feedback and new associations to continually improve the model. As mentioned, users may select, skip or upload images; data from these decisions are stored as triplets in the reference database.

The subject matter described in this disclosure may preferably be embodied in methods including the actions of: feature extraction, building an associative model, utilizing the model to recommend images, receiving user input, obtaining data based on user input, and refining the model.

In the preferred embodiment, feature extraction comprises extracting features from associated text, image and user/usage information and creating a three-component feature vector called a triplet. The feature extraction is content-aware and may include text-translation and/or transformation, various image-processing techniques and collecting user/usage related information.

The step of building of an associative model (modeling component) preferably entails creating an associative model based on triplets, stored in at least one reference database, using machine learning methods. The associative model uses feature-representation of the text, image and user/usage information which is stored in a triplet. The associative model learns a function which calculates the Illustration Index. An associator component uses the Illustration Index to rank images by their Illustration Index score and recommend appropriate images to correspond with a given text. The images may either be selected by users, in which case, the model is further refined based on the user selection, or automatically inserted. The system models the constellations represented by triplets in the space of the component's feature vectors.

During the user selection step (selector component), the user may select an image, skip images or upload images. The user's decisions/selections provide feedback to the system.

The system utilizes the continuously growing reference database of text-image-user/usage triplets and refines the associative model.

The foregoing has outlined some of the pertinent objects of the invention, which includes methods and systems for associating images to text and recommending images, whereby recommended images may be further selected, skipped, or replaced by user uploaded images, and whereby such user interactions enable further refinement of the system so as to provide personalized recommendations The system architecture and hardware is further described in the detailed description; these objects should be construed to be merely illustrative of some of the more prominent features and applications of the disclosure. Alternatives and variations described in the detailed description below are made a part of this summary. Accordingly, a fuller understanding of the subject matter may be had by referring to the detailed description of the preferred embodiment in addition to the claims and accompanying drawings.

BRIEF DESCRIPTION OF THE DRAWINGS

For a fuller understanding of the nature and objects of the invention, reference should be had to the following detailed description taken in connection with the accompanying drawings.

DETAILED DESCRIPTION

The present invention relates to a unique system for associating text with one or more personalized, relevant images. The image may be a still image, a picture, a moving, animated image, a video, and the like (collectively referred to as "image"). The various features of the system, and the manner in which they interrelate, are described in detail below.

Figure 1:
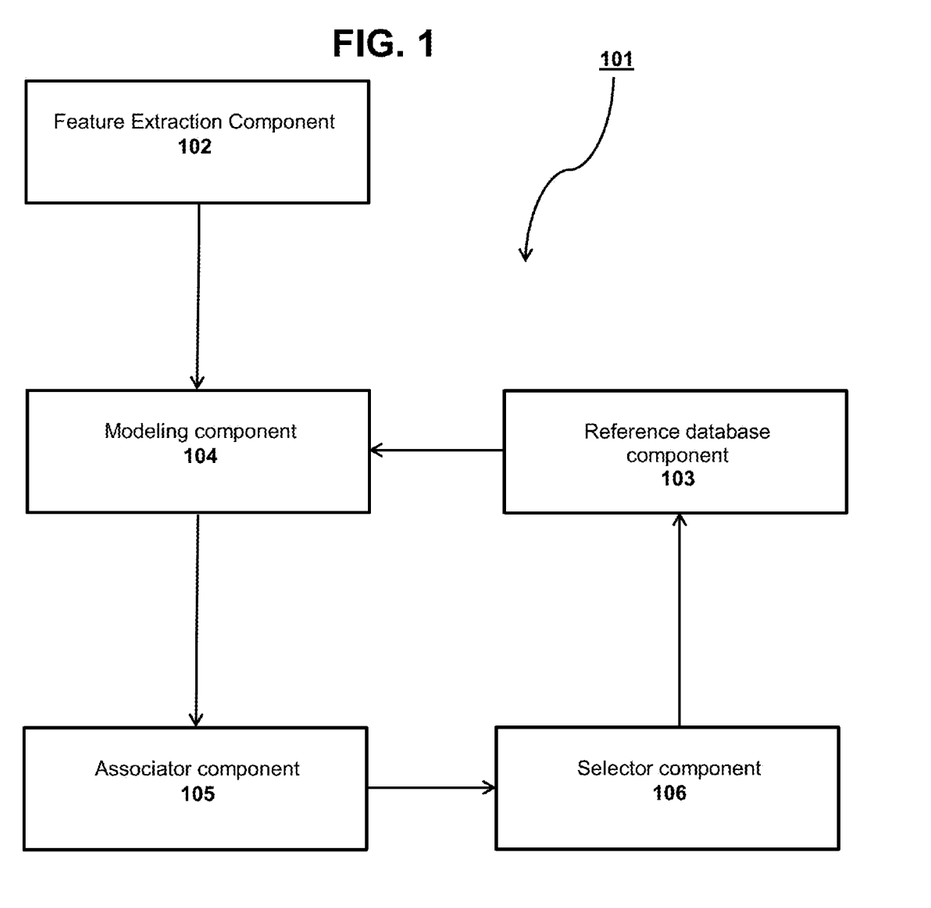
FIG. 1 is a flow chart illustrating the preferred embodiment.

As noted in FIG. 1, the system 101 of the present invention has at least five components. These include a feature extraction component 102, a reference database component 103, a modeling component 104, an associator component 105 and a selector component 106. The function and operation of each of these components is described next.

1. Feature Extraction Component:

The feature extraction component 102 of the preferred embodiment is a module that (1) processes the associated text, images and user/usage related information, (2) extracts features from them, and (3) represents the extracted, associated features in a three-component vector called a "triplet" or "associative triplet."

As a general notation, text/image/user/usage associations are described as (T,D,U), where T is for text, D is for image, and U is for user/usage. The extracted feature vector for (T,D,U) is noted as (x,y,z), which is a triplet, where x is the feature vector of text T, y is the feature vector or unique identifier of image D and z is the feature vector or unique identifier of user/usage z, accordingly.

Figure 2:
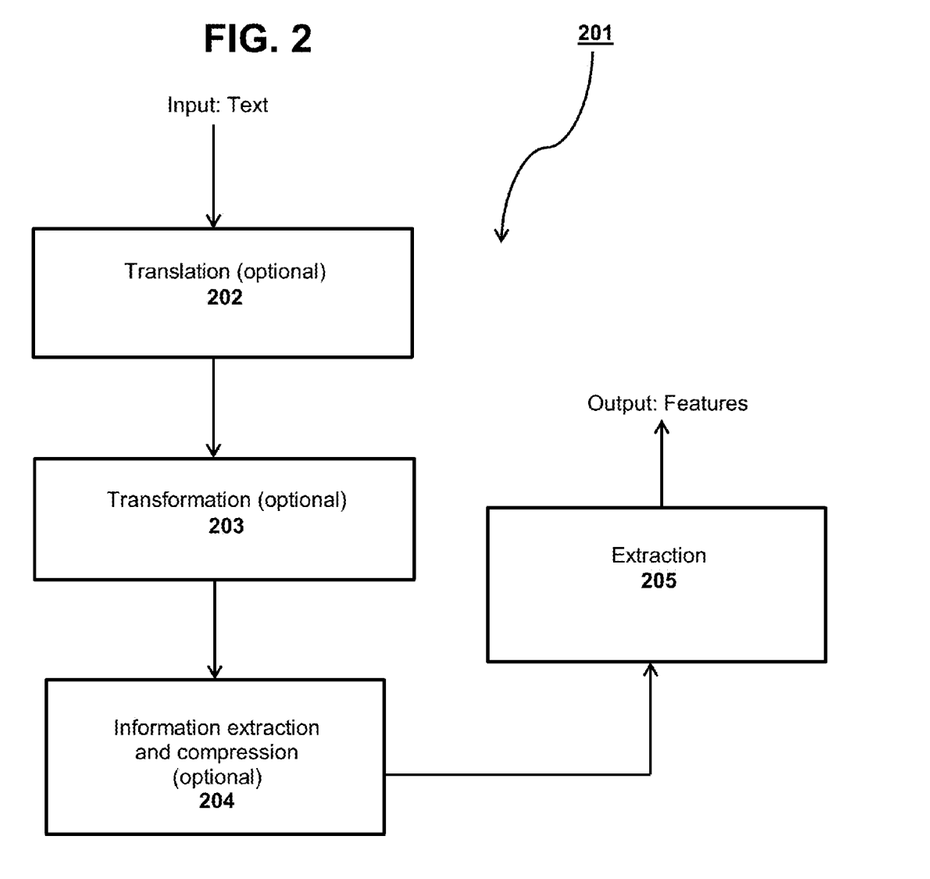
FIG. 2 is a flow chart illustrating the preferred method for text feature extraction.

The following methods provide for feature extraction of text, image and user/usage related information.

a. Text Based Feature Extraction:

Methods for feature extraction of text 201, as seen in FIG. 2, consist of an optional translation 202, transformation 203, and compression 204 and an obligatory feature extraction 205 part.

Before text feature extraction takes place, the following steps are preferably applied:

As an optional step, we may translate all textual content from any language to any natural or artificial language, for example English, Esperanto or other language using any available translator service. The step of translation to any common language makes the system and modeling language-independent, by enabling language-independent association of text, image and user/usage related information.

As a further optional step, any available automatic text transformation methods may be applied, for example removing non-informative text parts, such as unnecessary punctuations and text elements.

As a further optional step, we may apply any available text compression techniques, for example apply summarizer over the text. The purpose of steps 203-205 is to, for example, reduce a larger text to smaller one by using a "compressor", in order to obtain the important portions of the text.

The method of text feature extraction is as follows:

The input for text feature extraction is textual content, referred to simply as "text." Define T as text with optional text elements: [title], [abstract, lead], [body or body parts]. At least one block corresponding to [title], [abstract, lead], [body or body parts] blocks should contain text.

Extracted features may comprise, but are not limited to: letters, combination of letters, syllables, words, occurrence of words, synonyms, antonyms, statistical information (average word lengths), etc. calculated from the textual content.

Extracted features form a feature vector. If a block is empty, a zero vector is assigned to it.

In the case when [body or body parts] of T comprises separate body parts, the individual feature vectors may either be concatenated to make one text feature vector, or the feature vectors are created separately and concatenated using the following method:

a. Given a set of body parts ranging from $t_1, \ldots, t_n$. Given $x_1, \ldots, x_n$ as the extracted feature vectors from $t_1, \ldots, t_n$, accordingly. The methods that may be used for aggregating the $x_1, \ldots, x_n$ feature vectors, includes, but not limited to the followings:

i. sum or weighted average of the $x_1, \ldots, x_n$ vectors.
  ii. maximum, minimum, deviation, average of each component.
  iii. eigenvector that relates to the largest eigenvalue of $x_1 x_1^T + \ldots + x_n x_n^T$ matrix.

Then, the system concatenates the feature vectors extracted from T, as follows:

Given $x_1$ as the feature vector derived from the title, given $x_2$ as feature vector derived from the abstract, lead and given $x_3$ as the feature vector derived from the body or body parts, then Feature(T)=$x_1 x_2 x_3$, where $x_1 x_2 x_3$ means dimensional composition or concatenation.

The concatenation step described above is preferred, however this disclosure contemplates and encompasses variations in the means for concatenation.

b. Image Feature Extraction

The present invention also extracts features from images to be used as a second component of the associative triplet. Several existing image feature extraction methods may be used together, as follows:

Given D as an arbitrary image and g as a function, which assigns an image feature vector to D using g(D) mapping. The mapping may be implemented to retrieve only the unique identifier of the image. In this case the image feature vector contains only a simple unique identifier, which represents the URL or path of the image stored on a server. However, system may extract image feature vectors from any image by using the following image processing methods, such as but is not limited to the following:

a. Statistics of pixels and pixel-relations in the image-matrix.
   b. Binary pixel pattern distributions in the image matrix.
   c. Various statistics of transformed image. The transformation may be for example color filtering, other linear or non-linear mappings generally used in image processing.
   d. Binary feature components of object occurrences using publicly available object recognition methods. The goal is to determine whether the object is present in the image or not.
   e. In case of moving, animated images, features may be extracted from still image snapshots from the video at given intervals.

Note that extracting features from images instead of using simple unique identifier to reference them enables the system to rank any collection of images at a given text and user/usage constellation.

c. User/Usage—Feature Extraction

Any series of text-image associations which originate from one user (person or group of persons) or usage type (artists, healthcare, finance, etc.) more or less resemble one another. On the other hand, different persons or different usage types would produce disparate illustrations for the same text. For example, an engineer would choose different images than an artist for the same text. Or, different industries (healthcare, finance, etc.) have their own jargons and preferences. In order to accomplish the described user/usage customization, the system optionally and preferably utilizes user or usage related information as well as the third, z vector of the triplet.

User or usage information may be a unique user identification, IP address, segments or clusters of users or user groups, usage type (ex., business, private, etc.), category (ex., funny, solemn, etc.) or any features extracted from user/usage related behavior. There is no restriction on what kind of information is used on the user/usage side.

Note that user/usage information is optional. When it is not available, the representing feature vector z is a null vector, in which case, the modeling component (described below) will not take into account user/usage based features. For the purpose of this disclosure the term "triplet" is used, even when user/usage information is not taken into account, for example in the case of building up an initial reference database using only existing image/text associations from private or publically available sources.

The output of the feature extraction component is a triplet.

2. Reference Database Component

Figure 3:
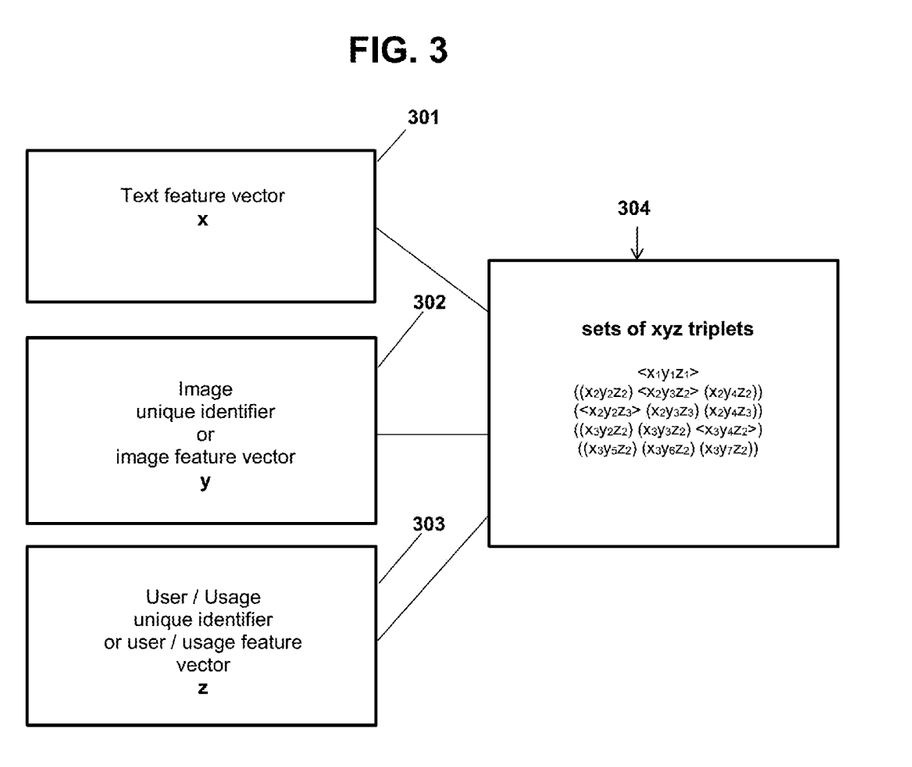
FIG. 3 shows an embodiment of the reference database.

As illustrated in FIG. 1, the reference database component 103 stores triplets. A detailed illustration of the reference database can be seen in FIG. 3. The triplet is a combination of a text feature vector 301, and image feature vector 302 and a user/usage-based vector 303. The reference database stores the triplets which contain at least an image feature vector, a text feature vector, and a user/usage feature vector 304.

The method of storing triplets depends on the way the association has been made:

a. If image D was selected by a user for illustrating text T during U circumstances, then ($<x_1,y_1,z_1>$) is stored, where "< >" bracelets, meaning that the triplet is selected.
   b. If there was a possibility of selection between $D_1, \ldots, D_k$ candidate illustrative images prior to association, in other words a selection task of $(T,D_1,U), \ldots, (T,D_k,U)$ was due and user chose $D_i$ ($1<=i<=k$), the system stores set of triplets using the following structure: $((x,y_1,z), \ldots, <x,y_i,z>, \ldots, (x,y_k,z))$, where x means features extracted from text T, z means features extracted from user/usage U and $y_1, \ldots, y_k$ means features extracted from $D_1, \ldots, D_k$, accordingly. Note that in this case the user thought $D_i$ is the best illustration image for the text.
   c. If no selection has been made and the user skipped (asked for a new set), all candidates are stored in form of set of triplets using parentheses "( )".

The actual embodiment of < > and ( ) notation and selection structure may vary, depending on embodiment of the reference database, each possible implementation is considered part of and contemplated by this disclosure.

The image feature vector of the triplet preferably has a special field which stores the link to the original image. The link may refer to any website or storage. The reference database may contain an image store which contains the original images as well.

A possible, but not exclusive method of building up an initial reference database is to process publicly available internet sources, such as search engines, news and knowledge aggregator sites, community sites. Sources for the images themselves may come from the user's own library (such as a camera roll), or a third party library of images for license, or publically available images which a user can access via a web browser application running on a user device. Ideally, the reference database initially contains a plurality of triplets taken from features extracted from existing, illustrated textual content. In this manner, the reference database may be initially populated with triplets for use by the associator component and modeling component so as to provide image recommendations as described below. In the case of building an initial reference database in this manner, user behavior (selections/skips) are not yet taken into account and therefore the preferred manner of populating the reference database would be to express the third, user/usage feature vector as a null vector.

3. Modeling Component

Figure 6:
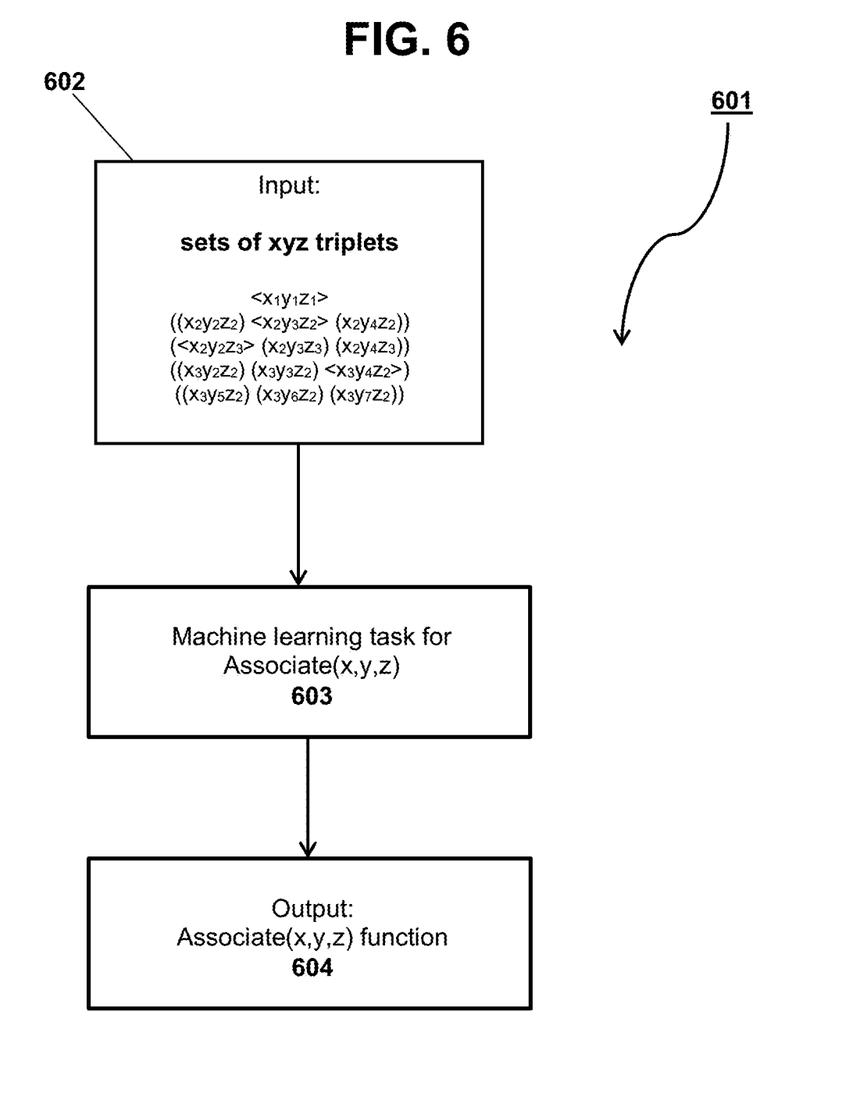
FIG. 6. shows the preferred embodiment of the Modeling component

As illustrated in FIG. 6, the modeling component 601 includes a machine learning component that uses sets of triplets 602 as learning samples. The task of the machine learning component is to learn text-image-user/usage associations based on stored triplets in order to make proper associations on any collection of images. In other words, the machine learning component's task is accomplished by learning associations that are represented by extracted features of the associated texts, images and user/usage related information.

This functionality is enabled as follows: the modeling component learns an Associate (x,y,z) association function 603, where x represents the text feature vector extracted from T=([title],[abstract],[body or body parts]), y represents the image feature vector of picture D and z represents features of user/usage information.

The model Associate (x,y,z) outputs a scalar number 604, which is the so called Illustration Index. The higher the Illustration Index is the more the text, the image and the user/usage are associated or "fit together." In other words, a higher Illustration Index value means that image y better illustrates text T for a given user/usage.

Associate (x,y,z) has the following requirements for elements of the reference database in approximate manner:
  a. It shall give a larger value for elements tagged with < > and a lesser value for elements tagged with ( ).
  b. Given the triplet set of ((x,$y_1$,z), . . . , <x,$y_i$,z>, . . . (x,$y_k$,z)) it shall give a larger value for Associate (x,$y_i$,z) than for the other triplets in the set.

The system implements Associate (x,y,z) function using appropriate machine learning methods, such as those machine learning methods known in the art, such as, but not limited to the following:
  a. memory based learning,
  b. probability approximation,
  c. classification approach,
  d. regression approach,
  e. learning to rank,
  f. collaborative filtering approach,
  g. recommendation methods.

The choice of which machine learning method to use depends on the way the system defines relations among the elements of the reference database and the possible values the system assigns to each element.
  a. An example of a relation is: Associate ($x_1$,$y_1$,$z_1$) must be greater than Associate ($x_2$,$y_2$,$z_2$).
  b. An example of assigning real number strategy is: ($x_1$,$y_1$, $z_1$)→$\text{numbers}$, <$x_2$,$y_2$,$z_2$>→$\text{number}_2$, . . . , ($x_n$, $y_n$,$z_n$)→$\text{number}_n$.

When the system uses only the positive < > samples of the reference database, memory-based learning algorithms and probability approximation modeling methods are applicable. If a value of 1 is assigned to positive < > samples and a value of 0 is assigned to negative ( ) samples, classification approach is a better choice. If weights are assigned to samples, which take into account a rank within a selection, regression methods are applicable. When magnitude scale is used, for example for each selected < > triplets we assign random ( ) triplets which are required to be larger, a partial ordering is defined. In this case learning to rank methods are applicable. Collaborative filtering and recommendation methods are applicable, when the selection behavior of different users are discovered and the system imitates behavior of similar users.

The accuracy of the association performed by Associate (x,y,z) may be improved by using the association data obtained by virtue of the user having selected an image to illustrate text, thereby validating an association of the image with that particular text. This means that, as number of sample text to image to user/usage associations grow, the function assigns relevant images even to abstract topics and the ranked list will contain personalized, relevant images at the top.

4. Associator Component

Figure 7:
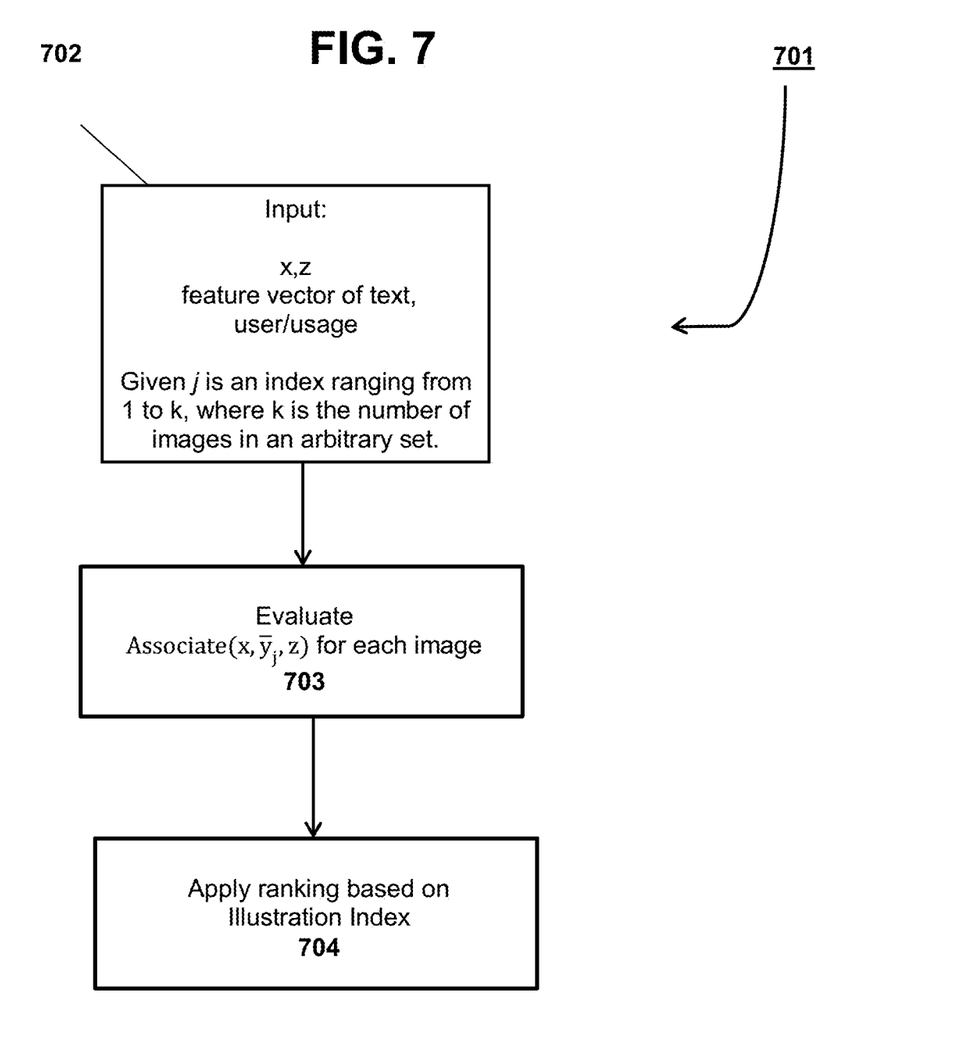
FIG. 7. shows the preferred embodiment of the Associator component

The associator component 105 utilizes the Associate ( ) function to calculate an Illustration Index for each image in the collection and rank images based on the Illustration Index, for example, from highest to lowest. The associator component is able to rank images from one or more collections of images which may include the images of the reference database or external sources of images as well. FIG. 7. shows a possible method for associator component 701.

As an input 702, given an M collection with $D_1$, . . . $D_k$ images and $\bar{y}_1$, . . . $\bar{y}_k$ is the extracted feature vector of the images, accordingly. Given x a feature vector of any arbitrary textual content, z is a feature vector of user/usage related information. Given j is an index ranging from 1 to k.

Value of k is arbitrary, user may rank the entire collection or subsets of collection.

The system ranks desired number of elements of the collection by evaluating Associate (x, $\bar{y}_j$, z) function for each image 703 and using its output, the Illustration Index, for ranking 704.

Images that may be found at the top of the list have more illustrative power than others at the bottom of the list.

In one implementation, a plurality of collections, such as thematic collections, may be ranked. If given $M^1$, . . . , $M^k$ collections ranging from 1 to k, for example $M^1$ is a business collection, $M^2$ is fun/leisure collection, $M^3$ is a family collection, etc., the associator component may rank elements of one or more of these special, thematic collections.

It should be noted that the system is able to retrieve recommended images from the reference database (where not just the triplets, but actual images may be stored or at least link to the actual image) or, the system may rank any collection of images, for example images located on the user's device (such as the user's personal computer or smart phone), or images located in any external storage.

As input text changes, the associator component refreshes the selection list by calling Associate (x, $\bar{y}_j$, z)method.

5. Selector Component

Figure 8:
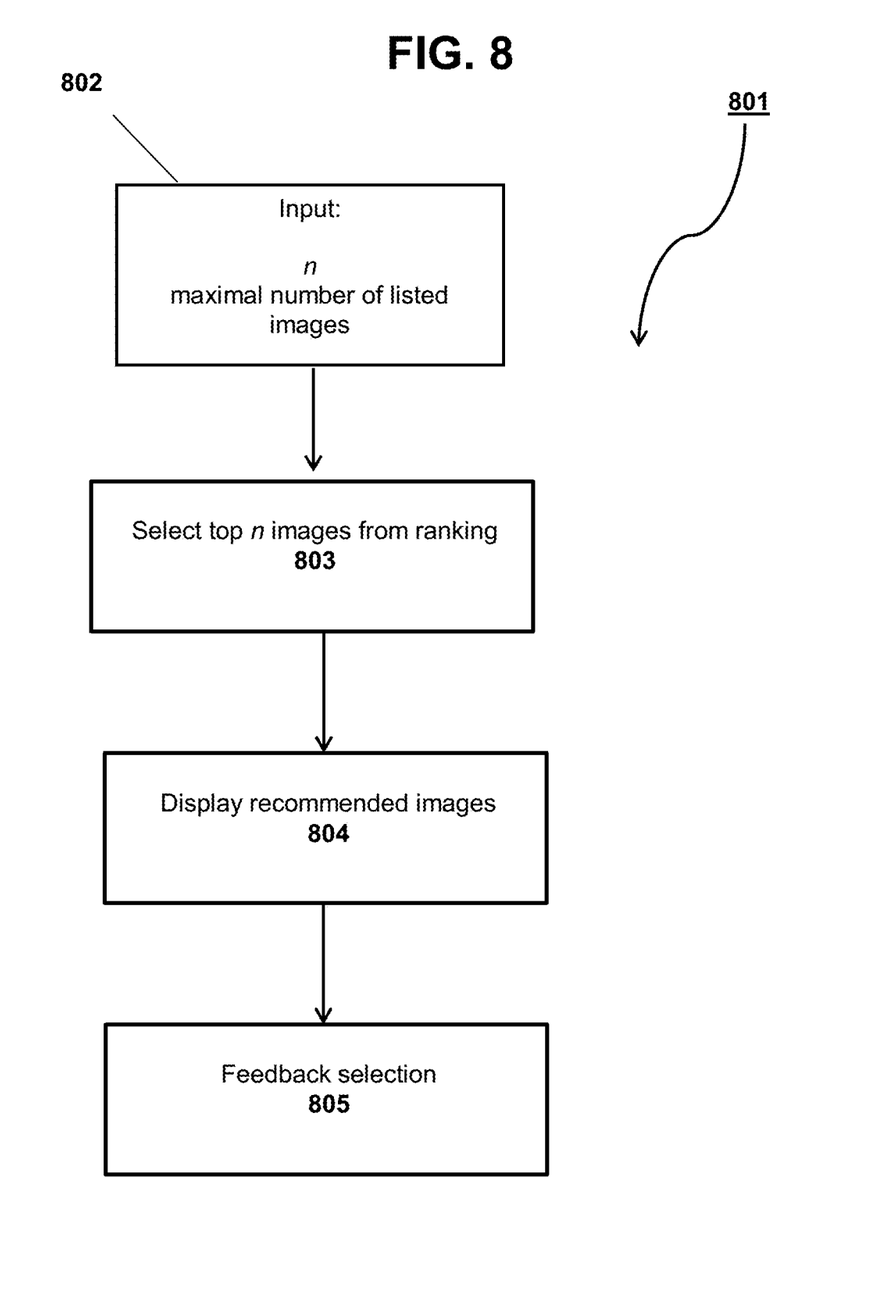
FIG. 8. shows the preferred embodiment of the Selector component

The selector component, illustrated on FIG. 8, 801, enables the visualization of a list or gallery of recommended images from which the user may choose. The user's selection or choice of image is taken as a determination of a relevant association, thereby providing further feedback to the system. The selector component is enabled as follows:
  a. Selector component uses ranked images from associator component as input 802. A parameter n determines how many recommended images will be listed 803.
  b. Display recommended images on the user's screen 804.
  c. User may select, skip or upload image.
  d. Feedback selection by updating reference database 805:
    i. Mark selected and skipped image's triplet.
    ii. Extract features from uploaded image and associated text for which the image was selected, along with the user/usage information, if any, and store new triplet in the reference database using the previously defined structure.

In one implementation, the selector component is not used and automatic associations are made by setting parameter n to zero. In this case no reference triplets are added.

As the reference database expands, the model may be refreshed on a regular basis.

Handling Special Cases:

The following additional, optional methods for handling special cases are also contemplated:
  a. The system enables the user to require a new set of images if none of the listed recommendations are satisfactory in the judgment of the user. Triplets for all rejected images are inserted to the reference database in order to help modeling.
  b. In the previous case, the system also enables users to upload any appropriate image to the system. This contributes not only to modeling but expands the reference database as well.
  c. A randomly selected image within $\epsilon$ distance from the first associated image is added to the selector. Given $y_*$ the image based feature vector of the selected image and $y_i$ is the feature vector of any image. Only those images should be selected, where $\|y_*-y_i\|<\epsilon$ is satisfied. The randomization helps to bring variety to the recommendations.

d. A collection D may be subject to different ranking at different usages as follows:

$$D^1=\{D_1^1,\ldots,D_{n_2}^1\}, \quad \text{usage 1}$$

$$D^2=\{D_1^2,\ldots,D_{n_2}^2\}, \quad \text{usage 2}$$

$$D^p=\{D_1^p,\ldots,D_{n_p}^p\}, \quad \text{usage } p$$

Practical Applications:

Without limitation of the generality of the foregoing, an example embodiment is provided using the elements described above.

Figure 5:
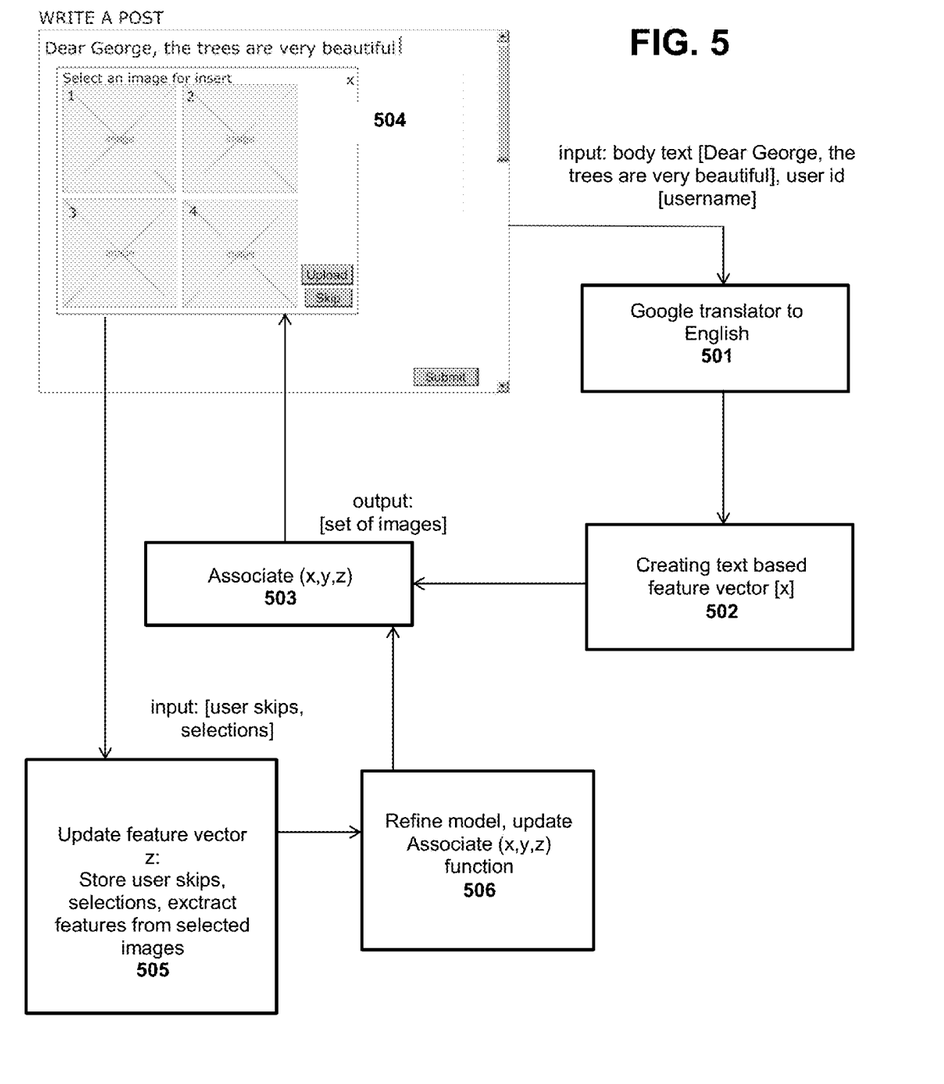
FIG. 5 illustrates an example embodiment of selecting images during writing.

An example use is in the context of a social network site where people send relatively brief text messages to each other. The text messages in this context would consist of a body and an associated image as illustration. A user logs in and begins to type the message, as seen on FIG. 5. The system in realtime extracts features from the message part which has been already typed. After a few characters, the list of the recommended images appears right next to the typing. As the user continues to type in the text, the images may alter. The user may select an image from the list (thereby creating a new associative triplet to be stored), skip the listed images to get a new set, or upload his/her own image. This implementation may be enabled as follows:

Define T as message where [title]—is empty, [abstract, lead]—is empty, [body or body parts] stores the content of the already typed part of the message. Use an external translator service (for example, Google) 501 to detect language and if it is not English, translate the text to English, regardless of the quality of the result. Then, create a text based feature vector as follows 502:
  a. Make pairs of the 26 English alphabets (aa,ab, . . . , xx,xz), sum of total pairs is 676.
  b. Assign an x vector that contains a histogram of pair occurrences in T.

Supposing the users have one or more unique identifiers (for example, login name), store the following information for each user 505:
  a. number of skips the user made
  b. number of selections the user made
  c. a vector created by concatenating the previously selected image's average vector and deviation vector. When an image is selected, the system converts it to 256 grey shades and calculates a histogram of grey shades to create average vector and deviation vector. Although these features are based on images, note that they are user-related features because they refer to user behavior.

The reference database is continuously growing by new selections and associations, including uploaded images 504.

In this example a unique identifier is attached to each image.

In this embodiment, a memory-based learning algorithm called nearest neighbor method is selected to accomplish the machine learning task. The method takes into consideration the user/usage and the textual features as well.

An example of possible embodiment of Associate (x,y,z) method 503 based on the nearest neighbor method, is the following:

Given two triplets (x,y,z) and $(\bar{x},\bar{y},\bar{z})$. Define distance of the triplets as follows:

$$d(x,y,z,\bar{x},\bar{y},\bar{z})=\alpha^*\|x-\bar{x}\|+\beta^*\|y-\bar{y}\|+\gamma^*\|z-\bar{z}\|$$

$\alpha+\beta+\gamma=1$ and $0\le\alpha,\beta,\gamma\le 1$, where $\alpha,\beta,\gamma$ are predefined parameters representing the importance of the vector-components.

Given a set of good associative triplets marked with < > as follows:

$<x_1,y_1,z_1>,\ldots,<x_n,y_n,z_n>$.

Then define Associate (x,y,z) function for any arbitrary (x,y,z) as follows:

$$\text{Associate}(x, y, z) = \max_i \left(2 - \frac{2}{(1 + \exp(-d(x, y, z, x_i, y_i, z_i)))}\right).$$

This function gives back a result of 1 for each $(x_i,y_i,z_i)$ pairs what the reference database already includes.

The value set of Associate ( ) function for arbitrary (x,y,z) is between 0 and 1.

For any arbitrary $M=(D_1,\ldots D_n)$ collection and $y_1^*,\ldots,y_n^*$ features extracted from them, Associate $(x,y_1^*,z)$ will rank collection M.

By expanding the reference database, the model automatically refines based on the definition of Associate (x,y,z) function 506.

Other possible embodiments of the present methods and systems disclosed may contain alternate, adequate algorithms for extracting text features, user-related or image-related features, and alternative machine learning methods.

Many other possible variations are contemplated and can be attained by applying Associate (x,y,z) function a different manner or modifying the system within the scope of the disclosure, such as the following:

Using feature vectors of Associate ( ) function in different order and/or applying alternate dimension-partitioning methods for feature-vectors and/or applying other machine learning methods, techniques; apart from described herein, but it is possible to describe by using Associate ( ) function, are considered part of this disclosure and contemplated alternative embodiments.

The present invention, as a framework may contain combination of various, custom selected methods that varies based on the actual scenario.

Other Use Cases

Figure 4:
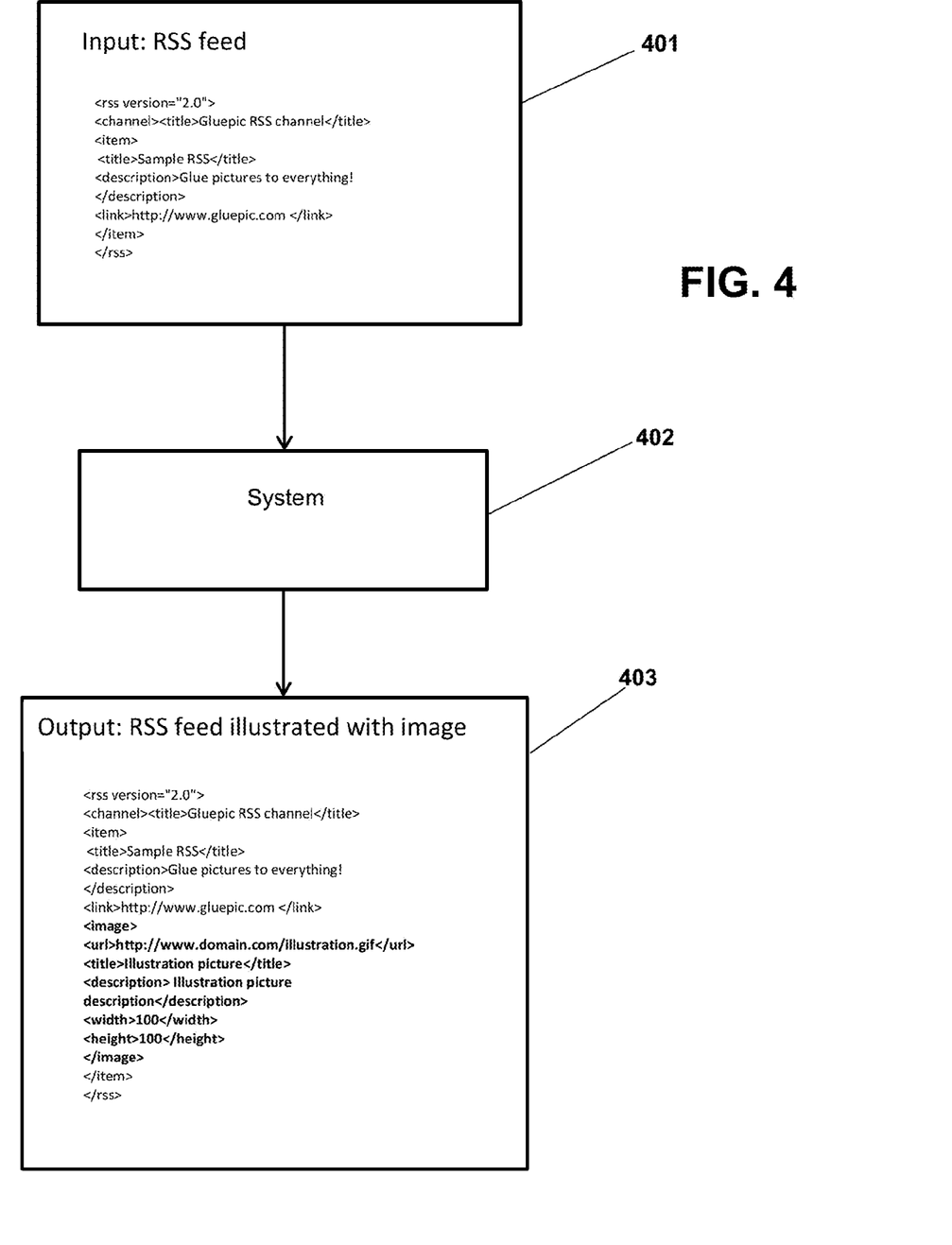
FIG. 4 illustrates an example embodiment of illustrating RSS feeds with images.

In other preferred embodiment of the system or method in accordance with the present disclosure, the system analyzes textual content in RSS feeds and associate relevant images to each title. FIG. 4 shows an illustration of this method, the XML file representing the RSS feed comes in without image, the present invention associates an illustration image to it. The output is a standard RSS content with associated image. This method works for RSS channels already containing images; they might be replaced or complemented.

Other possible usage areas of the system may include but not limited to: illustrate emails with images, illustrate posts, blogs, comments, e-books with images, etc. In a possible embodiment, it may work as an internet-based service in cloud environment that may be accessed via APIs.

As described before, the method gives the flexibility to build up a reference database using public sources and use this database to learn Associate (x,y,z) function, and then rank an external image collection for text illustration.

By discovering hidden relationships among abstract textual information, images and associative behavior, the present invention is a modern way of sketching the art side of human nature.

Figure 9:
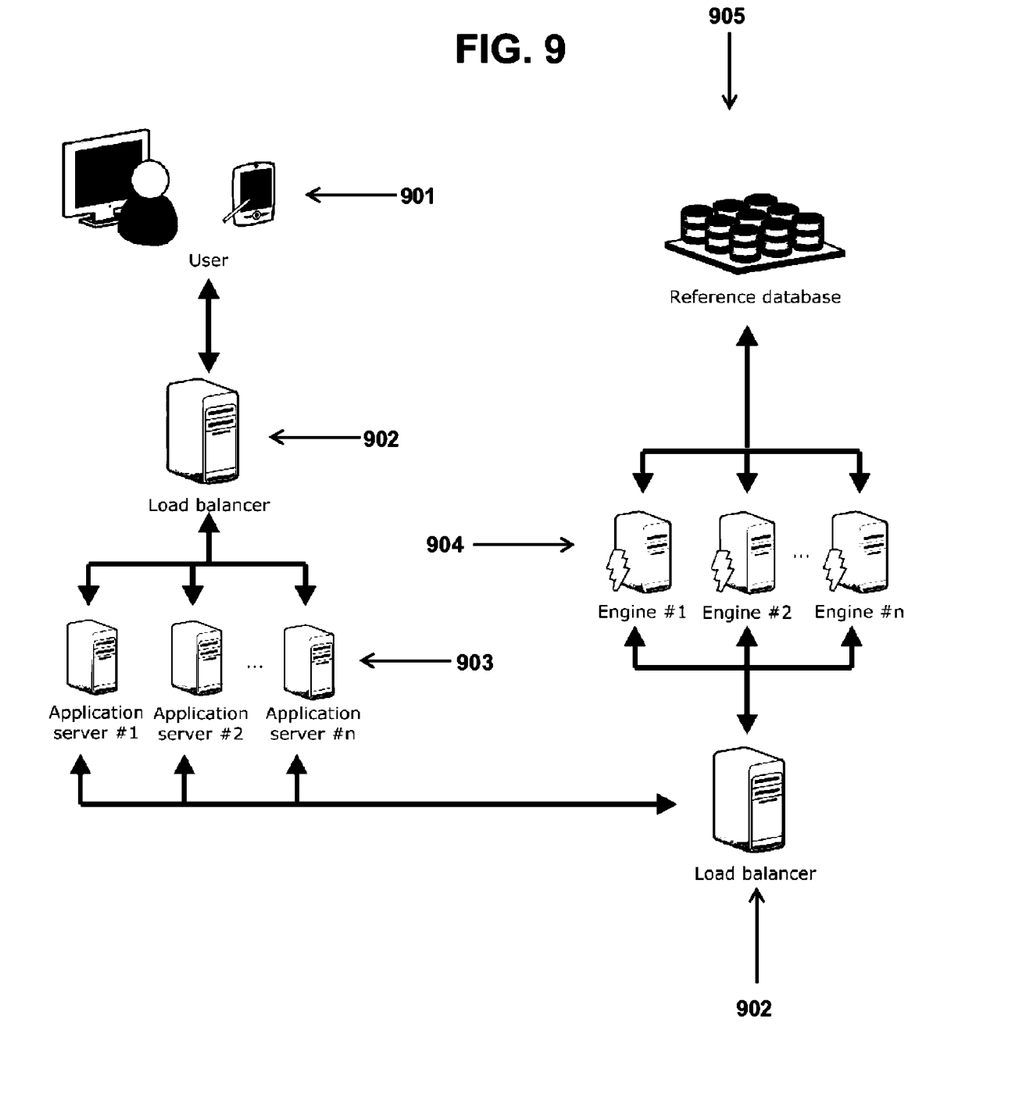
FIG. 9. illustrates and example hardware environment

System Architecture:

A possible hardware example is provided in FIG. 9. The user 901 actually interacts with one of the application servers 903 with a help of a load balancer server 902. The load balancer helps to distribute load over multiple servers. The application servers interacts with one of the servers which run system components (engines) 904. A load balancer 902 works here as well in order to provide easy scalability. The engines communicate with the reference database 905.

The exemplary embodiments of the present invention may be recorded in computer-readable media including program instructions to implement various operations embodied by a computer. The media also includes, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like.

A computing device, which may me a network of computing devices, can be used to practice the embodiments described. The system includes central processing unit (or processor), memory, storage, and input/output devices, each of which are interconnected via a system bus that couples various system components including the memory to the processor. Modules can be configured to control the processor to process instructions for execution within the system. Such executed instructions can implement one or more components of the system, for example, the feature extraction component. The processor is capable of processing instructions stored in memory or storage to display graphical information on an output device, said output device preferably consisting of output devices associated with a user device used by a user 901.

Memory can include multiple different types of memory with different performance characteristics and may be read only memory and random access memory. The disclosure may operate on a computing device with more than one processor or on a group of networked computing devices, servers, or a combination of both. The system can include clients and servers. A client and server are usually remote and interact via a communication network and programmed to interact in a client/server relationship.

The processor can include any general purpose processor and a hardware module or software modules stored in storage, configured to control the processor as well as a special-purpose processor where program instructions are incorporated into the actual processor design. The processor may be a completely self-contained computing system, containing multiple cores or processors, a bus, memory controller, cache, etc. A multi-core processor may be symmetric or asymmetric.

The bus may be any of several types of bus structures including a memory bus or memory controller, a peripheral bus, and a local bus using any of a variety of bus architectures. A basic input/output (BIOS) stored in read only memory or the like, may provide the basic routine that to assist in the transfer of information between elements within the computing device, such as during start-up. The computing system further includes storage such as a hard disk drive, a magnetic disk drive, an optical disk drive, tape drive or the like. Storage can include software modules, eg., for controlling the processor. Other hardware or software modules are contemplated. The storage device is connected to the bus by a drive interface. The drives and the associated computer-readable storage media provide nonvolatile storage of computer-readable instructions, data structures, program modules and other data for the computing device.

In one aspect, a hardware module that performs a particular function includes the software component stored in a non-transitory computer-readable medium in connection with the necessary hardware components, such as the processor, bus, display (also referred to as an output device), and so forth, to carry out the function. The "display" refers to visually perceptible display on a display device (such as a networked computing device for example, an end user's device) resulting from a tangible computer filed stored in its memory. This may originate from across a network, such as the Internet, a wireless communication network, or a system of connected networked computers. The display includes devices upon which information can be displayed in a manner perceptible to a user, such as a touchpad or touchscreen display, a computer monitor, an LED display, and the like means known in the art for producing visually perceptible output. The basic components are known to those with skill in the art and appropriate variations are contemplated depending on the type of device; the term "computing device" refers to any device, such as a user device, with processing capability such that it can execute instructions, for example, smartphones, PC computers, servers, telephones, and other similar devices.

Although the exemplary embodiment described herein employs the hard disk, storage, those skilled in the art appreciate that other types of computer-readable media may also be used in the exemplary operating environment. Non-transitory computer-readable storage media expressly exclude media such as energy, carrier signals, electromagnetic waves, and signals per se.

To enable user interaction with the computing device, an input device represents any number of input mechanisms, such as a microphone for speech, a touchscreen for gesture or graphical input, keyboard, mouse, motion input, speech, etc. An output device can also be one or more of a number of output mechanisms known to those of skill in the art. In some instances, multimodal systems enable a user to provide multiple types of input to communicate with the computing device. The communications interface generally governs and manages the user input and system output. There is no restriction on operating on any particular hardware configuration and the basic componentry here may easily be substituted for improved hardware or firmware arrangements as they are developed.

The preferred system embodiment is presented as including individual functional blocks including functional blocks labeled as a "processor" or processor. The functions of one or more processors may be provided by a single shared processor or multiple processors. (The term "processor" should not be construed to refer exclusively to hardware capable of executing software, and as used herein is also referred to as a "processing device".) Illustrative embodiments may include microprocessor and/or digital signal processor hardware, read only memory for storing software performing the operations discussed above, and random access memory for storing results.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the disclosed methods and/or can operate according to instructions in the recited non-transitory computer-readable storage media. Such logical operations can be implemented as modules configured to control the processor to perform particular functions according to the programming of the module. For example, modules controlling the processor to perform particular steps or a series of steps, however additional or fewer modules may be used. These modules may be stored on the storage and loaded into random access memory or memory at runtime or may be stored as would be known in the art in other computer-readable memory locations.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

What is claimed is:

1. A computer implemented method, using a processor of a server, for recommending images, the method comprising:
   receiving content comprising text,
   processing the content to extract data comprising text features, wherein the text features form a text feature vector;
   receiving a candidate set of image suggestions, the candidate set comprising images that may be submitted to a user taken from one or more collections of images, and for each image in the candidate set of image suggestions, processing the image to extract data comprising image features, wherein the image features form an image feature vector,
   receiving user information and processing the information to extract data comprising user features, wherein the user features form a user feature vector;
   storing the text feature vector, image feature vector, and user feature vector as a triplet in a reference database; and
   applying means for machine learning using said triplets to learn an association function to calculate an Illustration Index, comprising a score that measures the level of association of the image suggestion to the content;
   using the triplets stored in the reference database to generate one or more suggested images to be used with one or a plurality of subsequent text content input by a user in a user device; and
   displaying the one or more suggested images on a user device.

2. The method as in claim 1, wherein the one or more collections of images are images stored on the user device.

3. The method as in claim 1, wherein one or more collections of images are images obtained from publically available image content.

4. The method as in claim 1, wherein the user feature vector is a null vector.

5. The method as in claim 1, wherein the reference database is initially populated with sets of triplets.

6. The method as in claim 5, wherein the sets of triplets comprise text feature vectors and image feature vectors extracted from available illustrated textual content.

7. The method as in claim 1, wherein the reference database further comprises means to grow.

8. The method as in claim 7 wherein the reference database grows to include additional triplets based on data comprising a user's decision to select an image, the user's selection forming a determination that the image is associated with the text.

9. The method as in claim 8, wherein the image selected by the user is selected from one or more collections of images, wherein at least one or more collections of images comprise images uploaded from the user device.

10. The method as in claim 7, wherein the reference database grows to include additional triplets based on data comprising a user's decision to skip one or more image suggestions, the skip forming a determination that none of the suggested images were adequately associated with the text.

11. The method as in claim 1, wherein processing the text further comprises means for aggregating text feature vectors when the text comprises separate text elements, the separate text elements comprising a [title], an [abstract, lead], or a [body or body parts].

12. The method of claim 1, wherein the final set of image suggestions are ordered based on the Illustration Index.

13. The method as in claim 1, wherein the one or more collections of images comprise thematized collections of images.

14. A system comprising:
    a computing device having memory storing instructions, and a processing device to execute the instructions, wherein the instructions cause the computing device to:
    receive content comprising text,
    process the content to extract data comprising text features, wherein the text features form a text feature vector;
    receive a candidate set of image suggestions, the candidate set comprising images that may be submitted to a user taken from one or more collections of images, and for each image in the candidate set of image suggestions, processing the image to extract data comprising image features, wherein the image features form an image feature vector,
    receive user information and processing the information to extract data comprising user features, wherein the user features form a user feature vector;
    store the text feature vector, image feature vector, and user feature vector as a triplet in a reference database; and
    apply means for machine learning using said triplets to learn an association function to calculate an Illustration Index, comprising a score that measures the level of association of the image suggestion to the content.
    use the triplets stored in the reference database to generate one or more suggested images to be used with subsequent text content input by a user in a user device; and
    a display device for displaying the one or more suggested images on a user device.

15. The system as in claim 14, wherein the system further comprises means for suggesting images for use by a user to illustrate text, wherein the text further comprises text used in social media or text message content.

16. A computer implemented method performed by a data processing apparatus, comprising
   receiving, in response to input by a user in a user device, content comprising text;
   receiving a candidate set of image suggestions, the candidate set comprising images that may be submitted to a user taken from one or more collections of images;
   for each of the image suggestions in the candidate set of image suggestions determining whether the image suggestion satisfies an association criterion that defines the image suggestion as being associated with the content, the determining comprising;
      determining an association function for calculating an Illustration Index, comprising a score that measures the level of association of the image suggestion to the content;
      in response to determining that the image suggestion satisfies the association criterion, including the image suggestion in a final set of image suggestions; and;
      in response to determining that the image suggestion does not satisfy the association criterion, excluding the image suggestion from the final set of image suggestions; and
   providing the final set of image suggestions for display on the user device.

17. The method of claim 16, wherein the final set of image suggestions are ordered based on the Illustration Index.

18. The method of claim 16, wherein the candidate set of images is generated based on machine learning methods making use of triplets stored in a reference database, the triplets comprising:
   a text feature vector comprising data extracted from the content,
   an image feature vector comprising data extracted from the image;
   a user feature vector comprising data extracted from one or a combination of a plurality of the following:
      the user identity;
      image selections made by the user, the image selections forming a determination as to the association between an image and a given text;
      images skipped by the user, the skip forming a determination that the image is not associated with a given text; or
      demographic information of the user.

19. The method as in claim 16, wherein the final set of image selections further comprises random images within a predetermined distance from one or more images which satisfy the association criterion.

20. A system comprising:
   a. A feature extraction component coupled with a modeling component, wherein the modeling component is further coupled to an associator component, selector component, and a reference database component, wherein:
      i. the feature extraction component further comprises:
   means for extracting text features from text wherein the text features form a text feature vector;
   means for extracting image features from images wherein the image features form an image feature vector;
   means for extracting user features comprising data extracted from at least a user's behavior; and
   means for representing the text feature vector, image feature vector, and the user feature vector as a triplet comprising a three component vector;
      ii. the modeling component further comprises means for machine learning using said triplets as learning samples, wherein the modeling component learns an association function and the association function outputs an Illustration Index;
      iii. the associator component further comprises means for processing the association function to calculate the Illustration Index and rank images to be suggested to the user as associated with a given text;
      iv. the selector component further comprises means for processing user behavior to create new triplets;
      v. the reference database component further comprises means for storing said triplets in a reference database, the reference database configured to store a plurality of triplets and receive new triplets from the selector component from time to time;
   b. wherein the feature extraction component, modeling component, associator component, selector component, and reference database component are in communication with one another and coupled with at least one processing device and memory;
   c. wherein text input into a user device is:
      i. processed by the feature extraction component along with images taken from one or more collections of images;
      ii. the associator component calculates the Illustration Index for each image in a candidate set of images based on the output of an association function learned by the modeling component; and
   d. a final set of image suggestions are displayed on the user device; and
   e. wherein in response to a user's decision to select or skip an image, the selector component updates the reference database component with a new triplet to be used by the modeling component for learning the association function.

* * * * *